United States Patent

Gray

[15] 3,656,317

[45] Apr. 18, 1972

[54] ABLATIVE SYSTEM
[72] Inventor: Vernon H. Gray, Bay Village, Ohio
[73] Assignee: The United States of America as represented by the Administrator of the National Aeronautics and Space Administration
[22] Filed: June 17, 1970
[21] Appl. No.: 47,063

[52] U.S. Cl. ..............................62/467, 60/200 A, 60/265, 60/267, 102/105
[51] Int. Cl. ......................................................F25b 19/00
[58] Field of Search ...............62/467; 102/105; 60/265, 267, 60/200 A

[56] References Cited

UNITED STATES PATENTS

| | | | |
|---|---|---|---|
| 3,177,658 | 4/1965 | Eastman | 60/265 |
| 3,321,154 | 5/1967 | Downs | 102/105 X |
| 3,298,175 | 1/1967 | Morse | 62/467 X |
| 3,138,009 | 6/1964 | McCreight | 60/200 A X |
| 2,941,759 | 6/1960 | Rice et al. | 60/200 A X |
| 3,300,139 | 1/1967 | Feldman | 102/105 X |

Primary Examiner—Albert W. Davis, Jr.
Attorney—N. T. Musial, G. E. Shook and John R. Manning

[57] ABSTRACT

A carrier liquid containing ablative material bodies is supplied to a plenum chamber one wall of which has openings therethrough and which wall is exposed to a high temperature environment. The liquid and the bodies pass through the openings in the wall to form a self-replacing ablative surface.

In another embodiment the wall comprises honeycomb layers. Spheres containing ablative whiskers or wads, and a hardening catalyst for the carrier liquid are dispersed in the liquid.

Yet another embodiment utilizes wicks woven of ablative material fibers, and extending through the openings in the wall and into the plenum chamber containing the carrier liquid.

10 Claims, 3 Drawing Figures

PATENTED APR 18 1972 3,656,317

INVENTOR
VERNON H. GRAY

BY
Norman T. Musial
ATTORNEYS

[3,656,317]

ABLATIVE SYSTEM

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

The invention relates to ablative surfaces and is directed more particularly to an ablative system having a surface which is self-replacing.

An ablative surface is one which chars and wears away because it is exposed to high temperature or is moving at high speed in relation to a fluid with which it is in contact. In wearing away, the ablative surface prevents frictional heat from destroying a body on which it is deposited, by utilizing several heat-transfer mechanisms.

Ablative systems of the prior art include layers of epoxy, phenolic or other resins deposited on the surface to be protected or in the cells of a honeycomb wall. Other ablative systems have provided passageways through the ablative material through which liquid waste materials could be ejected at critically high temperatures to provide additional cooling.

With the ablative system utilizing layers of resin, the ablative surface is continually wearing away. Consequently, the ablative layer may have to be made excessively thick to endure the time and temperature conditions to which it will be subjected. This excessive thickness is particularly undesirable in such applications as space vehicles where it will cause undesirable extra weight of in rocket nozzles where the interior diameter may have to be smaller than desired and will continually change during operation.

Solid ablative layers require a lengthy, complex and costly fabrication process, they cannot be reused, and they undergo dimensional changes during use. Radiatively cooled surfaces require expensive refractory materials and are limited to low heat fluxes. Regeneratively cooled surfaces require liquid propellants (generally cryogenics), are intricate in design, and are limited to the heat sink capability of the propellant. Surface cooling systems using auxiliary liquids are also intricate in design and manufacture, tend to be heavy due to the added fluid and tankage, have an appreciable unrecovered energy loss, and in boiling systems, are in danger of destructive "burn out" due to film boiling at hot spots. Transpiration cooling requires a complex distribution and flow control system, and tends to be unreliable and wasteful in operation. Heat sink techniques are limited to short durations and low heat fluxes. Surface coatings and coverings require expensive materials and have difficult mechanical problems of oxidation, chemical reaction and degradation.

OBJECTS AND SUMMARY OF THE INVENTION

It is an object of the invention to provide an improved ablative system.

It is another object of the invention to provide an ablative surface which is relatively thin and which advantageously allows a great deal of flexibility of design of rocket nozzles and other structures requiring ablative cooling.

Still another object of the invention is to provide an ablative surface which is self-replacing as ablation takes place.

Yet another object of the invention is to provide an ablative system which is not destroyed by the ablative action and hence is reusable.

An additional object of the invention is to provide an ablative system which is simple to fabricate and requires only relatively inexpensive materials.

In summary, the invention provides an ablative system in which the ablative surface is constantly replaced as it wears away. The system is reusable, lightweight, easy to fabricate, and provides a relatively thin ablative surface.

DESCRIPTION OF THE PREFERRED EMBODIMENT

Figure 1:
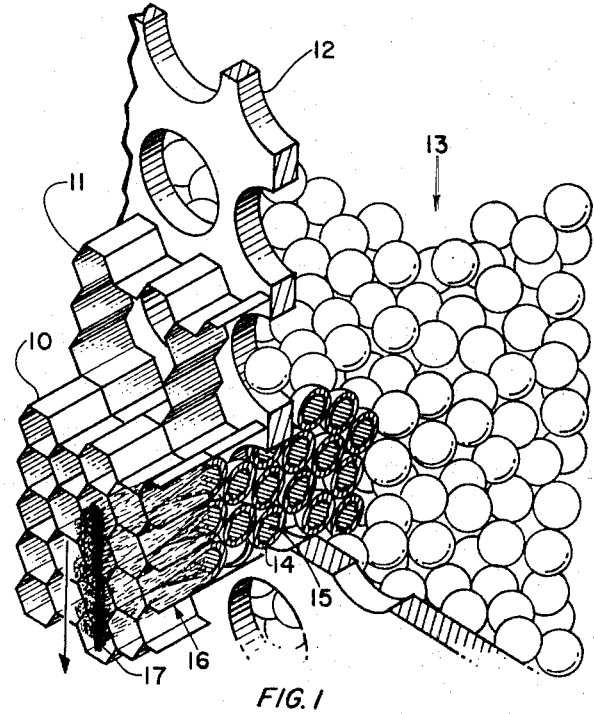
FIG. 1 is a partially cutaway pictorial view of a portion of a system embodying the invention.

Referring now to FIG. 1 it will be seen that an ablative system embodying the invention may include a first layer of small chambers or cells such as honeycomb panel 10, a second layer of large chambers or cells such as honeycomb panel 11, and an apertured wall 12. The panels 10 and 11 and the wall 12 are preferably fabricated from heat resistant metal and are attached to one another by welding or the like to form a unitary structure. Each of the large cells communicates with the space outside the apertured wall 12 through a respective one of the apertures. At least two of the small cells of the honeycomb panel 10 communicate with each of the large cells in the panel 11. In FIG. 1, nine small cells communicate with each large cell.

To the end that a self-replacing ablative surface will be formed, spheres 13 carried in a semi-cured resinous fluid such as a whisker or fiber-filled phenolic polymer are urged under pressure through the apertures in wall 12 and into the large cells of panel 11. These spheres 13 are of such a size that, in their rigid form, they are unable to pass through the small cells of the panel 10.

Each of the spheres 13, comprises a crust of shell 14 of a material such as a low melting point plastic like methyl methacrylate and a core 15 of material such as a compressed wad of straight or coiled metallic or asbestos fibers or the like immersed in a liquid accelerating agent or catalyst such as hexamethylenetetramine, for example. This catalyst will react with the semi-cured resinous fluid to harden it into a rubbery mass as shown at 16 when the shell 14 melts, as will be described presently. The extreme heat to which the inner surface of the panel 10 is exposed, chars the rubbery mass 16 as it moves toward the heat and causes ablation of the charred surface 17.

Figure 2:
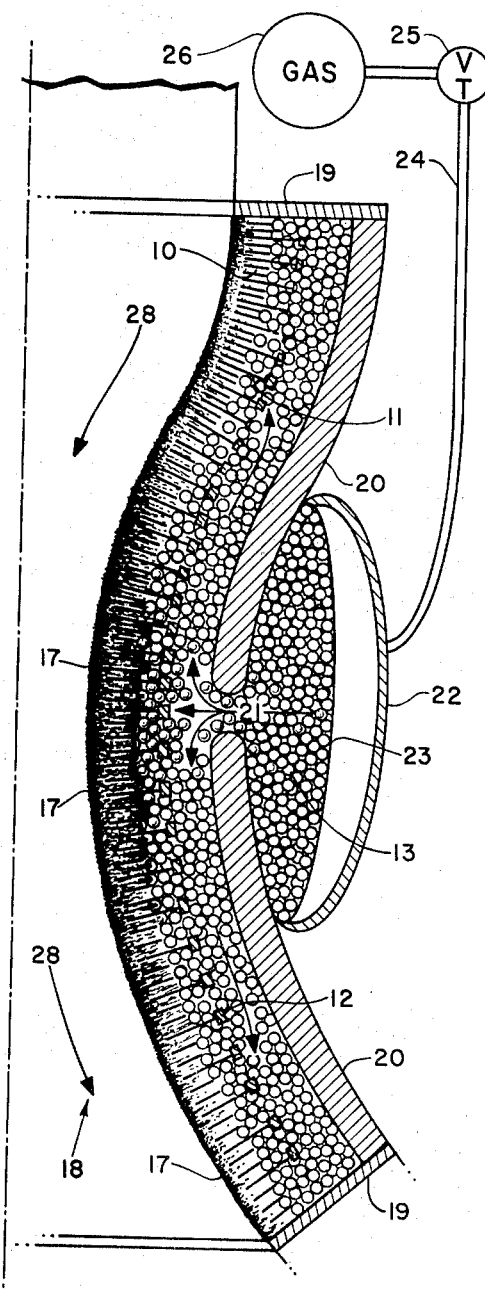
FIG. 2 is a longitudinal section of the wall of the throat of a rocket nozzle embodying the invention.

Referring now to FIG. 2, there is shown a cross-sectional view of a portion of a rocket nozzle 18 incorporating the structure shown in FIG. 1 and like parts are identified by like numerals.

The rocket nozzle is provided with annular end walls 19 and an annular exterior wall 20 having an inlet port 21 therein. The space between the apertured plate 12 and the nozzle outer wall 20 serves as a plenum chamber for distributing the spheres 13 to the apertures in plate 12.

In order to force the spheres 13 through the inlet port 21 into the distribution chamber, a toroidal tank 22 is disposed around the throat of the rocket nozzle and a toroidal bladder 23 is disposed inside the tank 22. A suitable gas such as nitrogen is directed into a space between the bladder 23 and the tank 22 via a conduit 24 and a throttle valve 25 from a pressurized gas source 26. As the throttle valve 25 is opened, the gas pressure between the tank 22 and the bladder 23 increases forcing the spheres 13 through the port 21 into the plenum chamber and then through the apertures in the wall 12 and into the large cells of the honeycomb panel 11. As explained previously, the spheres cannot pass through the small cells of the panel 10 until the heat softens their shells.

When the rocket is fired (or in the general sense, when heat is applied to the surface), the temperature rises through the ablative layer and the small honeycomb panel 10 until the crust of some of the rigid spheres 13 melt or soften, allowing the spheres to enter the cells and thus transfer material toward the ablative layer. As each sphere melts, the core 15 of the sphere is free to release its material to the mixture in the cell. The semi-cured resinous fluid between the spheres then mixes with the accelerator agent from the core of the spheres and, in the increasing temperature level of the honeycomb cell, quickly hardens and expands slightly. In addition, the fibrous material, such as the compressed wads in the core of the spheres and the whiskers dispersed in the resinous fluid, mix into the resin which cures into a stiff, rubbery type of fiberglass composite. This composite is gradually forced out of the honeycomb cells to merge into a continuous surface layer. The composite out-gases and ablates, creating a large temperature gradient in the char layer that protects the honeycomb from the flame temperatures.

In operation, the fluid flow rate through the gate to each small honeycomb cell adjusts itself to maintain the temperature at that point close to the melting temperature of the sphere shell material. This temperature depends on the selection of material, and can be fixed as low as 200°–300° F. The temperature rise through the small honeycomb depends mainly on the thermal diffusivity of the composite material there, and the thickness of the ablative layer adjusts itself so that the flow through the small cells matches the ablation rate of the char layers.

Figure 3:
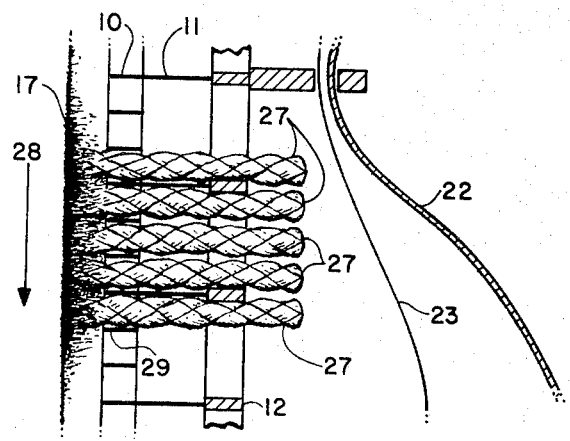
FIG. 3 illustrates an embodiment of the invention utilizing wicks.

FIG. 3 illustrates an embodiment of the structure shown in FIG. 1 and like parts are identified by like numerals. As shown in FIG. 3, rope wicks 27 extend through the apertured plate 12, honeycomb layer 11 and honeycomb layer 10. To provide a suitable ablative system, each cell of the honeycomb layer 10 is provided with a rope wick.

The space between the apertured plate 12 and the bladder 23 contains a fluid, such as ethylene glycol and water, which boils above the low melting temperature of a wick-type plastic material to be described presently. When gas pressure is supplied to the space between the bladder 23 and the tank 22, the fluid and the wicks 27 are forced toward the hot flowing gas designated by the arrow 28.

The wicks may be woven of solid ablative material such as metal, asbestos or phenolic fibers and may be saturated with the semi-cured resinous fluid contained between the apertured plate 12 and the bladder 23. Each wick is provided with either a core, a sleeve, or an impregnated filler of a low melting point plastic material of the type which forms the shell 14 of the spheres 13 of FIG. 1. This material melts at a slight constriction 29 at the exit (hot) end of the cells 10, allowing the wick to move out and replace the ablating layer 17. If desired, the wicks can be pre-formed so as to have hexagonal cross-sectional configurations before being disposed in the small cells of the honeycomb layer 10. However, it should be understood that the small cells of the honeycomb layer 10 need not be hexagonal but, if desired, may be cubical, cylindrical or any other suitable shape. Likewise, the cells of layer 11 need not be of a specific configuration.

ALTERNATE EMBODIMENTS

In alternate embodiments of the invention, the honeycomb layer 10 may be replaced by a wall having openings therethrough and comprising a heat resistant material such as porous stainless steel, or layers of screen wire. When a porous wall or layer of screens are utilized, neither the spheres 13 of FIGS. 1 and 2 nor the wicks 27 of FIG. 3 are used. Instead, the semi-cured resinous liquid stored in the bladder 23 contains metal and/or fiber whiskers which tend to block the openings in the porous wall. This action causes the build-up of an ablative layer on the surface of the porous wall exposed to the high temperature fluid.

It will be understood that the above-described invention may be changed or modified by those skilled in the art without departing from the spirit and scope of the invention as set forth in the claims appended hereto.

What is claimed is:
1. An ablative system comprising:
    a first wall comprising a first layer of cells and a second layer of cells, each cell of said second layer being in communication with at least two of said cells of said first layer;
    a second wall spaced apart from said first wall and forming a plenum chamber therewith, said second wall including an inlet port;
    a reservoir communication with said inlet port;
    a carrier liquid disposed in said reservoir;
    ablative material bodies dispersed in said carrier liquid;
    pressure means for forcing said carrier liquid and said ablative bodies into said plenum chamber and through said openings in said first wall; and
    spheres dispersed in said carrier fluid, each sphere comprising a low-melting point plastic crust and a core of catalytic material which will react with said carrier liquid to harden same when said plastic crust melts.

2. The ablative system of claim 1 and including an apertured wall disposed in contact with said second layer of cells, each aperture in said apertured wall corresponding to a cell in said second layer of cells.

3. The ablative system of claim 1 wherein said first and second layers are honeycomb panels.

4. The ablative system of claim 1 wherein said carrier liquid is a phenolic polymer, said crusts of said spheres are methyl methocrylate and said cores of said spheres are hexamethylenetetramine.

5. The ablative system of claim 1 and further including strands of ablative material in said cores of said spheres.

6. The ablative system of claim 1 wherein the diameter of said spheres is greater than the minimum dimension encountered in any cell of said first layer of cells by spheres passing therethrough.

7. The ablative system of claim 1 wherein said carrier liquid is a mixture of ethylene glycol and water.

8. The ablative system of claim 1 wherein said reservoir is a bladder and said pressure means is a tank connected to a source of gas, said bladder being disposed inside of said tank whereby gas pressure from said source of gas compresses said bladder.

9. The ablative system of claim 1 wherein said carrier liquid is a semi-cured resinous fluid.

10. The ablative system of claim 1 wherein said ablative material bodies are metal and asbestos whiskers.

* * * * *